(12) United States Patent
Zhang

(10) Patent No.: US 7,128,841 B2
(45) Date of Patent: Oct. 31, 2006

(54) DISPERSED ZERO-VALENT IRON COLLOIDS

(75) Inventor: Wei-xian Zhang, Bethlehem, PA (US)

(73) Assignee: Lehigh University, Bethlehem, PA (US)

( * ) Notice: Subject to any disclaimer, the term of this patent is extended or adjusted under 35 U.S.C. 154(b) by 179 days.

(21) Appl. No.: 10/798,626

(22) Filed: Mar. 11, 2004

(65) Prior Publication Data
US 2005/0199556 A1    Sep. 15, 2005

(51) Int. Cl.
C02F 1/00 (2006.01)
(52) U.S. Cl. ............... 210/747; 405/128.1; 405/128.5; 252/175; 588/901
(58) Field of Classification Search ............... 210/747; 405/128.1, 128.5; 252/175; 588/901
See application file for complete search history.

(56) References Cited

U.S. PATENT DOCUMENTS

| 5,624,552 | A | | 4/1997 | Vales et al. | |
|---|---|---|---|---|---|
| 5,733,067 | A | * | 3/1998 | Hunt et al. | 405/128.5 |
| 5,759,389 | A | | 6/1998 | Fernando et al. | |
| 5,833,388 | A | * | 11/1998 | Edwards et al. | 405/52 |
| 5,857,810 | A | * | 1/1999 | Cantrell et al. | 405/263 |
| 5,975,798 | A | * | 11/1999 | Liskowitz et al. | 405/128.5 |
| 5,975,800 | A | * | 11/1999 | Edwards et al. | 405/128.15 |
| 6,039,882 | A | * | 3/2000 | Wolfe et al. | 588/316 |
| 6,242,663 | B1 | | 6/2001 | Ponder et al. | |
| 6,254,786 | B1 | * | 7/2001 | Carpenter et al. | 210/747 |
| 6,287,472 | B1 | | 9/2001 | Gillham et al. | |
| 6,719,902 | B1 | * | 4/2004 | Alvarez et al. | 210/601 |
| 6,787,034 | B1 | * | 9/2004 | Noland et al. | 210/610 |
| 2003/0134409 | A1 | | 7/2003 | Mallouk et al. | |

OTHER PUBLICATIONS

Wei-xian Zhang, A Method for Treating Contaminated Water, Department of Civil and Environmental Engineering Lehigh University, Jul. 1, 2003, pp. 1-19.
International Search Report, Appln. No. PCT/US05/06061, dated Feb. 28, 2005.

* cited by examiner

Primary Examiner—Betsey Morrison Hoey
(74) Attorney, Agent, or Firm—RatnerPrestia

(57) ABSTRACT

Stable dispersions of zero-valent iron particles are produced by milling of micro- and nano-scale iron particles (colloids) in the presence of a dispersant or dispersants.

9 Claims, 13 Drawing Sheets

DISPERSED ZERO-VALENT IRON COLLOIDS

BACKGROUND OF THE INVENTION

The present invention pertains to production of zero-valent iron colloids and use of zero-valent iron colloids in treating contaminated water.

In the past decade the use of metallic or zero-valent iron (ZVI) in the form of iron fillings or powders for the reduction of halogenated organic contaminants such carbon tetrachloride (CT, $CCL_4$), chloroform (CF, $CHCl_3$), trichloroethene (TCE, $C_2HCl_3$), and tetrachloroethene (PCE, $C_2Cl_4$) for environmental remediation has emerged. Iron is a moderate reducing reagent. Reactions of iron with dissolved oxygen and to some extent with water are the main reactions in classical electrochemistry (e.g., corrosion). The corrosion reactions can be inhibited or accelerated by manipulating solution chemistry and/or solid (metal) composition. This is echoed in the transformation of hazardous and toxic chemicals in which iron oxidation is coupled to the contaminant reduction. For example, tetrachloroethene ($C_2Cl_4$), a common solvent, can accept electrons from iron oxidation and be reduced to ethene in accordance with the following reaction:

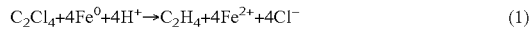

$$C_2Cl_4 + 4Fe^0 + 4H^+ \rightarrow C_2H_4 + 4Fe^{2+} + 4Cl^- \qquad (1)$$

Environmental applications of metallic iron have been enthusiastically accepted by many users and regulatory agencies, largely due to the low cost and absence of any known toxicity induced by iron.

So far, the main approach for the application of zero-valent iron in environmental remediation is to build in-ground barriers filled with zero-valent iron. Barriers containing zero-valent iron are typically installed across the flow path of groundwater. When the contaminated water passes through the reactive or adsorptive materials, contaminants in the water are removed by various physical and chemical mechanisms. Such treatment barriers are often called "permeable reactive barriers" (PRBs) as the barriers are usually more water permeable than the native soil/sediment materials. Examples of such techniques are remediants are disclosed in U.S. Pat. Nos.: 5,624,552; 5,759,389; 6,242,663 B1; and 6,287,472 B1 and U.S. Patent Application Publication No. US 2003/0134409 A1.

It should be noted that permeable reactive barriers are often installed in the downstream direction of the contaminated plume flow or development to contain the spread of the contaminant plume. This represents a passive approach for site remediation as the contaminant source(s) can not be treated directly. Iron is heavy (7,800 kg/m³) so that large amounts of iron are needed to construct an iron permeable reactive barrier. Furthermore, construction cost is relatively high, especially for deep aquifers. Construction of such barriers at many sites might not be feasible due to the presence of existing high value structures such as buildings and airport runways. Those shortcomings may have significantly limited the applications of iron permeable reactive barriers.

SUMMARY OF THE INVENTION

The primary goal of this invention was to develop methods for the preparation of stable suspensions (dispersions) of zero-valent iron. Dispersions of zero-valent iron prepared according to the invention can be injected directly into soil and groundwater for site remediation.

Stable dispersions of zero-valent iron are produced by milling of micro- and nano-scale iron particles (colloids) in the presence of dispersant(s), e.g. ammonia polymethacrylate and sodium polymethacrylate. Up to 30% wt of iron can be dispersed into an aqueous solution. Small amounts of ammonia polymethacrylate or sodium polymethacrylate are needed to attain stable dispersion of iron colloids. Using the process of the invention micrometer size iron particles were reduced to well-dispersed nano-scale (<100 nm) particles after milling. The dispersed iron particles have been shown to be effective for the degradation of chlorinated hydrocarbons (e.g., trichloroethene) in water.

Thus in one aspect the present invention is a method for treating contaminated water comprising the steps of: a) preparing a stable dispersion of zero-valent iron particles having a maximum average size of 100 nanometers; and b) applying the zero valent iron dispersion to the contaminated water.

In another aspect the present invention is a composition for treating contaminants in water consisting of: a stabilized colloidal suspension of zero valent iron particles wherein the zero valent iron particles have an average size less than 100 nanometers.

In still another aspect the present invention is a method for preparing a suspension zero-valent iron particles comprising the steps of: preparing a stabilized dispersant of iron particles having a size no larger than 10 µm; and grinding or milling the stabilized dispersant for a time sufficient to reduce the size of the zero valent iron particles to a maximum size of 100 nm.

DETAILED DESCRIPTION OF THE INVENTION

To overcome shortcomings of the prior art, the present invention, in one aspect is a process for preparing zero-valent iron suspensions which can be: (i) used directly at the source of the pollution, (ii) applied to deep aquifers, and (iii) spread over large areas of contaminated soil or water.

One solution is based upon dispersed zero-valent iron in which iron particles are distributed through aqueous solution and remain in suspension for extended periods of time (e.g., days). Key features for this method include: reduction of iron particle size from micrometer scale to nanometer scale by using milling and grinding to provide a cost effective method to produce iron nanoparticles, and stabilization of iron colloids with effective dispersants to enable the iron particles to be easily used for soil and groundwater treatment.

A key element for such a solution is to use smaller iron particles (colloids). Colloidal particles settle slowly due to random Brownian motion and less gravitational effect. Experience from the pigment and paint industries suggests that well dispersed metal oxides could be attained for particles up to 10 micrometers in average diameter.

Nanoscale zero-valent iron particles have been reported and have been successfully tested. These particles are in general less than 100 nanometers and exhibit very high activity for a large variety of contaminants. Application of the nanoscale iron particles for waste treatment have also been reported.

Figure 1:
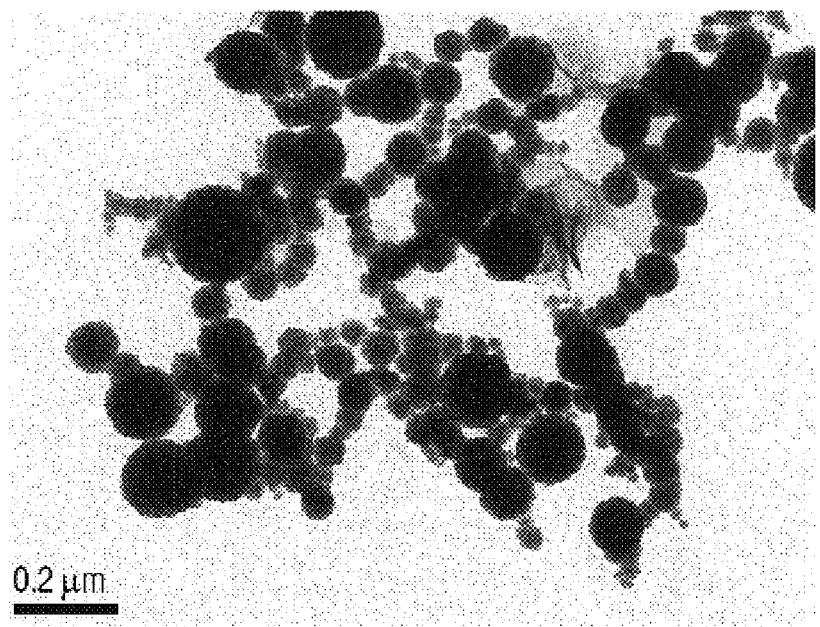
FIG. 1 is an image by electron microscopy of nano-scale iron particles having an average size between 50 and 100 nm.

A significant problem for the colloidal particles is the tendency of aggregation by which small particles tend to form larger aggregates that settle rapidly. As shown in FIG. 1, nanoscale iron particles are loosely connected to each other. The aggregates settle quickly out of water so that mobility of these particles is fairly limited in soil and groundwater where the flow is slow (e.g., on the scale of foot/day).

In order to produce a stable dispersion, a number of parameters must be carefully controlled. A basic aspect is the stability of the zero valent iron suspension. The particles must not be too large (in general, not greater than ~10 µm). The other important factor is the attractive force between the iron particles. Attractive van der Waals forces exist between all particles regardless of any other force that might be involved. If the attractive force is large enough, the iron particles will collide and stick together, leading to the formation of aggregates and rapid sedimentation.

Three basic approaches can be employed to minimize the particle aggregation and produce stable iron dispersion: (A) repulsion between electrostatic charges (i.e., electrostatic stabilization), (B) repulsion between adsorbed polymer molecules (steric stabilization), and (C) a combination of the two (electrosteric stabilization).

(A) Electrostatic Stabilization

The state of the electric charge of the particles of a colloidal dispersion is always an important factor governing the resistance to agglomeration or flocculation. The magnitude of the surface charge determines the level of the repulsion between the particles and, hence, the stability of a dispersion containing the particles. The magnitude and sign of the surface charge can be obtained from electrokinetic measurements in which the motion of the charged particles in an electric field is measured. In practice, the electric potential near the surface of the particle (e.g. the zeta potential, $\zeta$) is measured and used as an indication of the expected level of repulsion. The corresponding surface charge can be determined from $\zeta$-potential using theoretical equations and the properties of the suspension.

Correlation between the magnitude of $\zeta$-potential and stability of a hydrophobic dispersion has long been recognized resulting in the approximate working rule that a zeta potential of at least 30 mV is necessary for long term dispersion stability. Furthermore, a negative surface charge is needed for colloids to be used for soil and groundwater treatment. Soil surfaces typically have negative surface charges so that colloids with positive charges could be attracted to and immobilized on soil grains. Negative surface charge below −30 mV could enable the iron colloids to transport with less restraint in the groundwater environment.

B. Steric Stabilization

Steric stabilization is the term used to indicate the type of stabilization of a suspension using adsorbed polymers. When two colloids approach each other, the adsorbed polymers overlap and lead to a thermodynamically less stable state. As a result, adsorbed polymers could be prevent colloidal aggregation under various conditions.

For an adsorbed polymer to provide steric stabilization the molecules must be firmly anchored to the particle surface to withstand shear force, but only at a few points so that the bulk of the polymer molecules extend into water a significant distance. This requires a careful match of polymer, particle, and water interactions.

The most effective steric stabilizers are block or graft copolymers that contain both anchoring groups and stabilizing chains. The anchoring groups have strong affinity for the particle surface and are usually insoluble in water. These groups provide strong adsorption of the polymer molecule on the iron particle surface, to prevent its being displaced during particle collisions. The stabilizing chains having strong affinity for water, thus increasing the stability or "solubility" of the colloids in water.

Electrostatic and Steric Stabilization can be combined, where it is known as electrosteric stabilization. Commonly used polymers for aqueous dispersion are listed in Table 1.

TABLE 1

Commonly used polymers for sterically stabilized aqueous dispersions

| Anchoring Groups | Stabilizing Chains |
| --- | --- |
| Polystyrene | Polyethylene oxide |
| Polyvinyl acetate | Polyvinyl alcohol |
| Polymethyl methacrylate | Polyacrylic acid |
| Polyacrylonitrile | Polymethacrylic acid |
| Polydimethylsiloxane | Polyacrylamide |
| Polyvinyl chloride | Polyvinyl pyrrolidone |
| Polyethylene | Polyethylene imine |
| Polypropylene | Polyvinyl methyl ether |
| Polylauryl methacrylate | Poly(4-vinyl pyridine) |

One important feature of this invention is to use conventional milling/grinding techniques to produce nanoscale iron particles. Typically iron particles are produced by chemical sythnesis, i.e., the iron nanoparticles grow out of smaller clusters, ions or atoms. The chemical methods are often expensive as various chemical reagents are needed. Many steps are necessary to produce acceptable nanoparticles. Mechanical grinding/milling on the other hand are relatively simple processes, involving few steps and chemical reagents. More importantly, the feedstock (raw materials) is fine iron powders (typically having an average particle size measured on a micrometer scale) which are relatively inexpensive and readily available.

Figure 2:
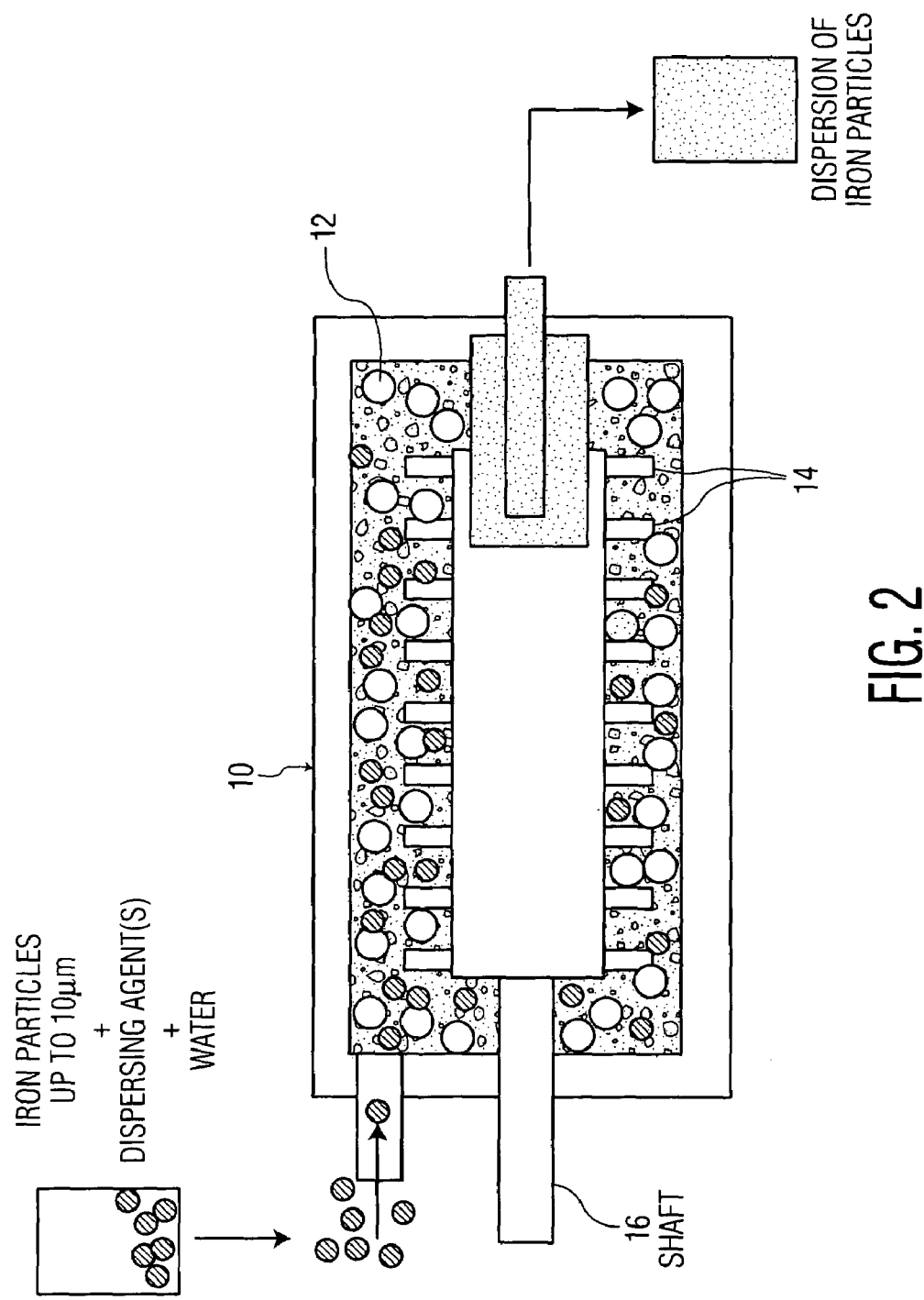
FIG. 2 is a schematic representation of a milling or grinding apparatus to produce zero valent iron particle dispersions with iron particles having an average size less than 100 nm.

According to this invention a device called attritor is used to prepare zero valent iron dispersions. Such a device as shown schematically in FIG. 2 is a stirred-media mill 10 in which the grinding media 12 are moved by a series of rods 14 attached to a central shaft (16). Shear fields and impacts are generated by the motion of the rotating rods, which lead to more efficient power transmission, finer grinding and shorter grinding time. Tests described herein were conducted with a NETZSCH Labstar™ mill available from Netzsch Incorporated of Exton, Pa. with 0.6 L capacity. Larger apparatus is sold under the name of NETZSCH LMZ ZETA™ mills.

Different types of grinding media (e.g., beads) are available, including but not limited to iron, steel, alumina, zirconia, zirconium silicate, steatite, silicon nitride, silicon carbide and tungsten carbide. To produce zero valent iron dispersions, iron or steel beads are favored as the grinding medium as there will be no cross contamination caused by fragments from the medium (e.g. beads). Smaller beads are preferred, e.g., iron or steel beads having a diameter of 100–250 µm. For the tests conducted and reported herein 150 µm steel shot was used as the grinding medium.

Two salts of polymethacrylic acid, sodium polymethacrylate (PMAA—Na) and ammonia polymethacrylate (PMAA—NH$_4$) were used as the dispersants in demonstrating the present invention. They are sold commercially under the trade names Darvan 811 and Darvan C respectively. The degree of polymerization, n, (or the molecular weight) was reported as being between ~1000 and ~50,000.

The following diagram illustrates the polymer segments of PMAA—Na and dissociation to form the charged polymer.

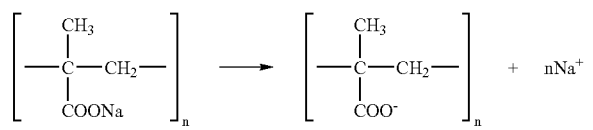

Depending on the solution pH, the fraction of the functional groups that are dissociated (—COO$^-$) will vary. For pH>7, the functional groups are almost fully dissociated and carry negative charges.

Figure 3:
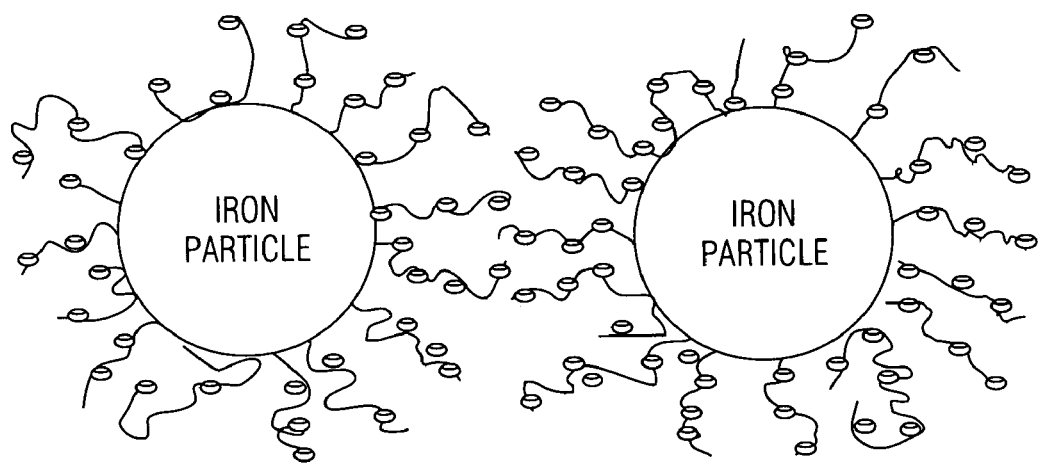
FIG. 3 is a schematic representation of the electrosteric stabilization of iron colloids in water.

FIG. 3 schematically illustrates the electrosteric stabilization of iron colloids in water. The negativity charged PMAA—Na sorbed on the iron particle surface generates electrosteric and steric repulsion between iron colloids. As a result, the iron particles remain apart and stable in the aqueous solution.

Example: Tests were conducted with the following parameters and procedures:

1) Fill the grinding chamber with up to 80–85% of the grinding media beads (150 µm steel shot)
2) Add a solution containing up to 70% water and 30% iron particles (1–10 µm)
3) Add 1–2% wt dispersant (e.g., ammonia polymethacrylate or sodium polymethacrylate)
4) Grind for up to 4 hours depending on the particle size of the feed particles, at a power input of 1.5–1.8 KW per liter of solution, at a speed of 2200–2400 RPM, and at a temperature <55° C. inside the grinding apparatus.

The tests were conducted with the Netzsch Labstar mill filled with 150 µm steel short. Up to 30% by wt of iron can be dispersed into an aqueous solution. Typically, less than 1–2% of ammonia polymethacrylate or sodium polymethacrylate is needed to attain stable dispersion of iron colloids. Observations with an electron microscope suggested that the micrometer iron particles charged into the mill were reduced to well-dispersed nanoscale (<100 nm) particles after 1–4 hours of milling. The dispersed iron particles have been shown to be effective for the degradation of chlorinated hydrocarbons (e.g., trichloroethene) in water.

Figure 4:
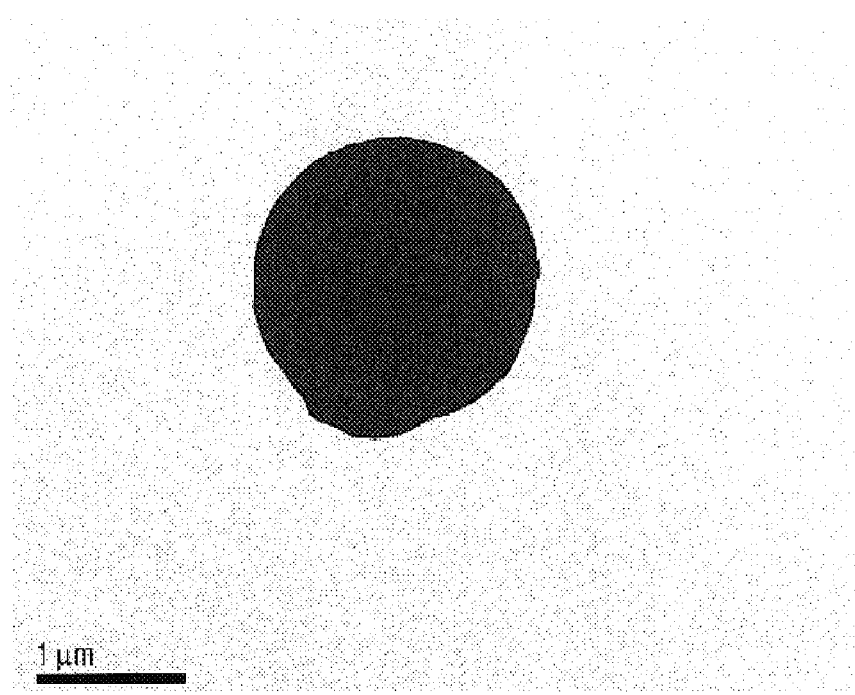
FIG. 4 is an image by electron microscopy of an iron particle before grinding.
Figure 5:
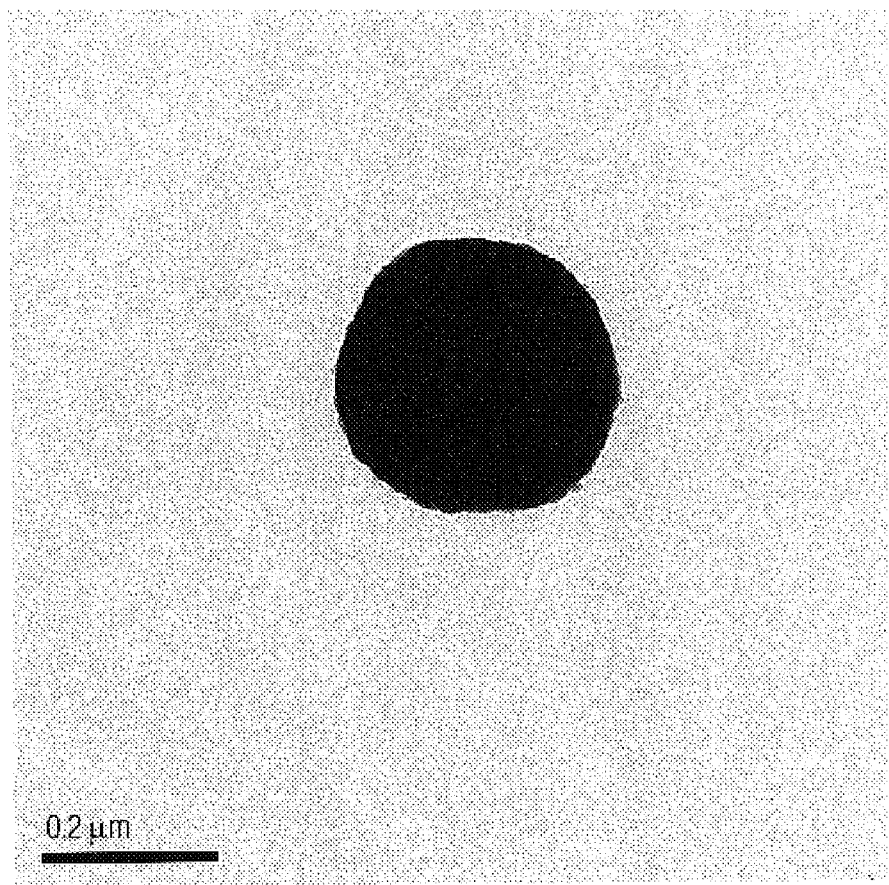
FIG. 5 is an image by electron microscopy of a different iron particle prior to grinding.
Figure 6:
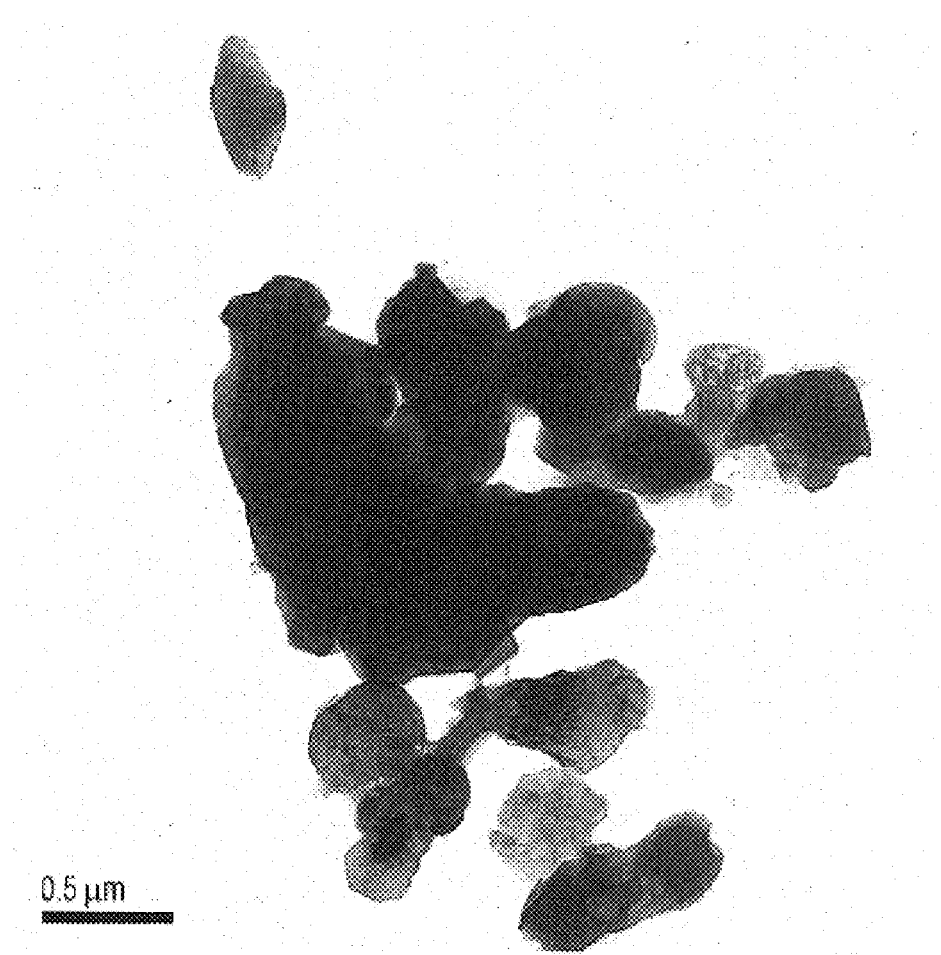
FIG. 6 is an image by electron microscopy of iron particles after 45 minutes of grinding.

In general, stable dispersions of zero valent iron can be made from both microscale and nanoscale iron particles with a grinding time greater than 1 hour. Particle size can be reduced from microscale particles as shown in FIGS. 4 and 5. FIG. 6 is an image of iron particles after 45 minutes of grinding showing break-up of some particles and the shape of the particles becoming irregular.

Figure 7:
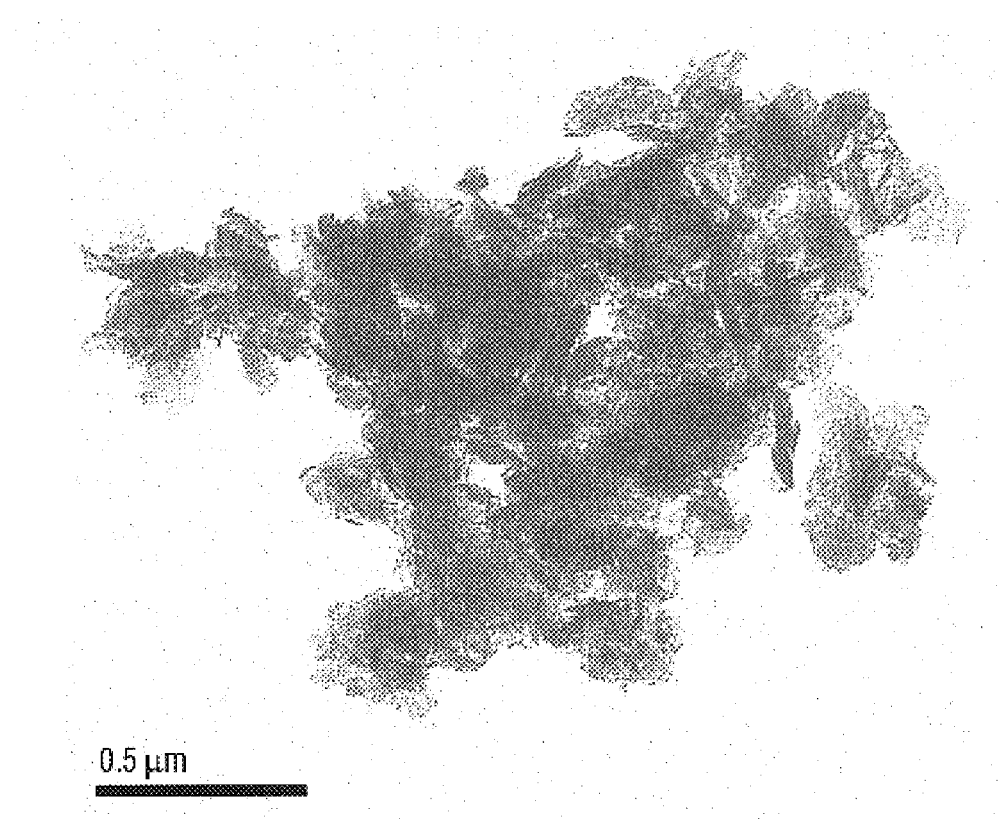
FIG. 7 is an image by electron microscopy of iron particles after 90 minutes of grinding.
Figure 8:
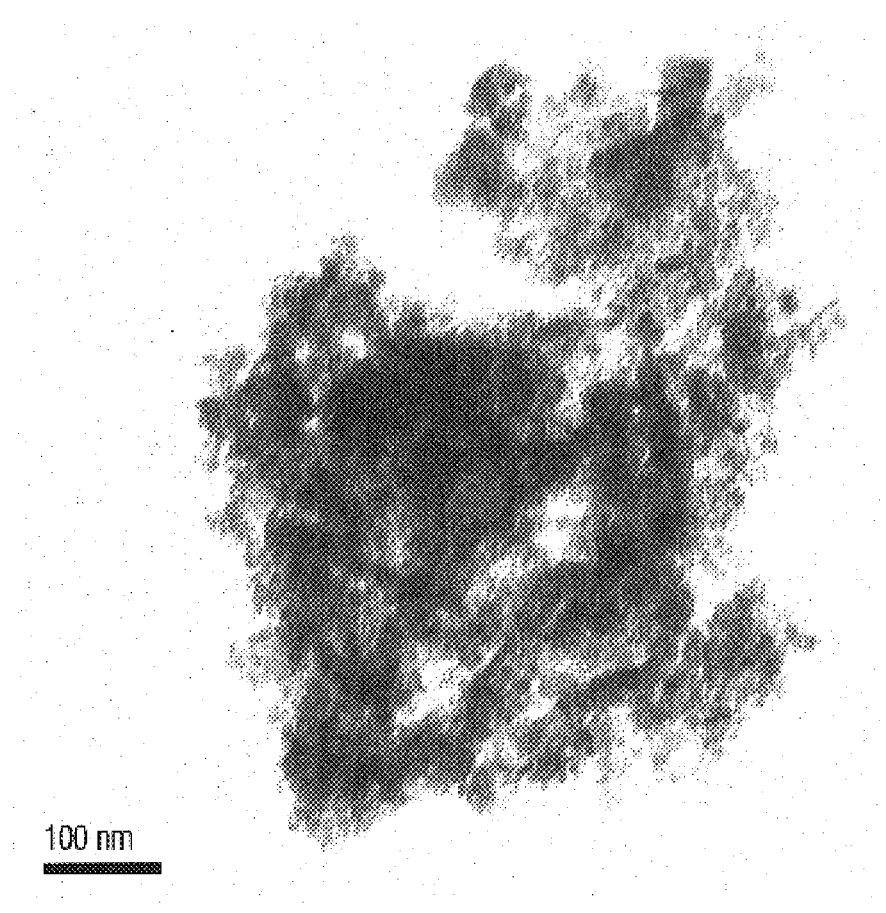
FIG. 8 is an image by electron microscopy of iron particles after 180 minutes of grinding.
Figure 9:
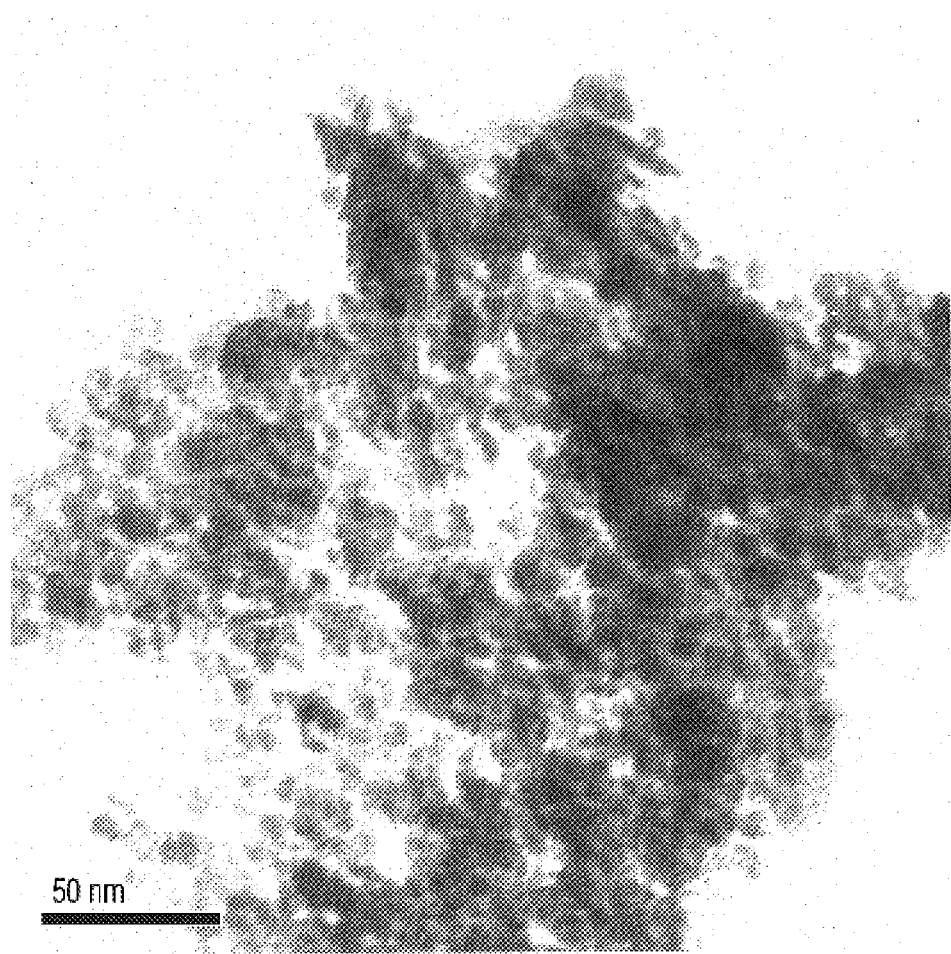
FIG. 9 is an image by electron microscopy of iron particles after 210 minutes of grinding.

FIG. 7 is an image of the iron particles after 90 minutes of grinding at which time the microscale iron particle are reduced to mostly submicron colloids (e.g., <1 µm). FIG. 8 is an image of iron particles after 180 minutes of grinding where most of the particles are reduced to nanoscale colloidal size (e.g., <100 nm). FIG. 9 is an image of iron particles after 210 minutes of grinding wherein the microscale iron particles have been reduced to mostly submicron colloidal size (e.g. <100 nm).

Figure 10:
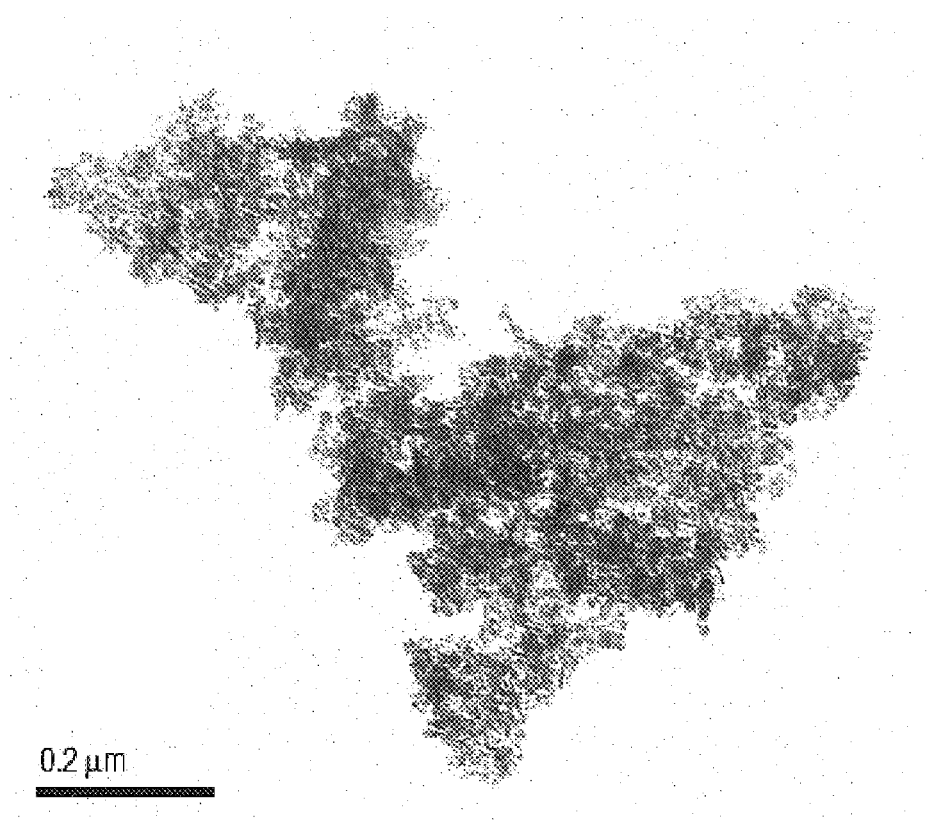
FIG. 10 is an image by electron microscopy of iron particles after 240 minutes of grinding.

FIG. 10 is an image of iron particles after 240 minutes of grinding wherein the iron particles have been reduced to mostly submicron colloidal size (e.g. <100 nm). Average particles were reduced to 10–50 nm. Specific surface area of the iron particles was increased from 0.6 m$^3$/g before grinding to >5.2–20 m$^2$/g after 4 hours of grinding.

Figure 11:
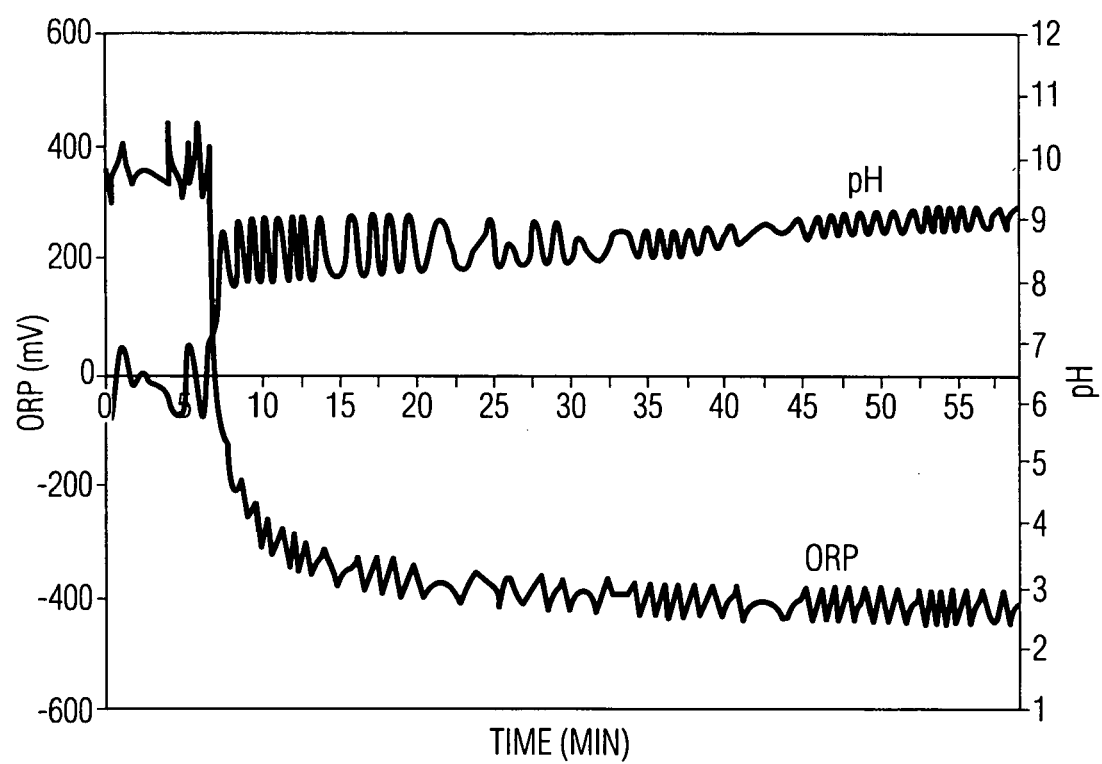
FIG. 11 is a plot of solution pH and oxidation potential changes as a function of time for compositions of the present invention.

FIG. 11 is a plot of pH and oxidation-reduction potential (ORP) against time for dispersed iron particles produced according to the invention. The plot of FIG. 11 shows that for a processed iron dispersion (~200 mg/L) the iron particles are reactive toward water and oxygen, consistent with classical electrochemistry.

Figure 12:
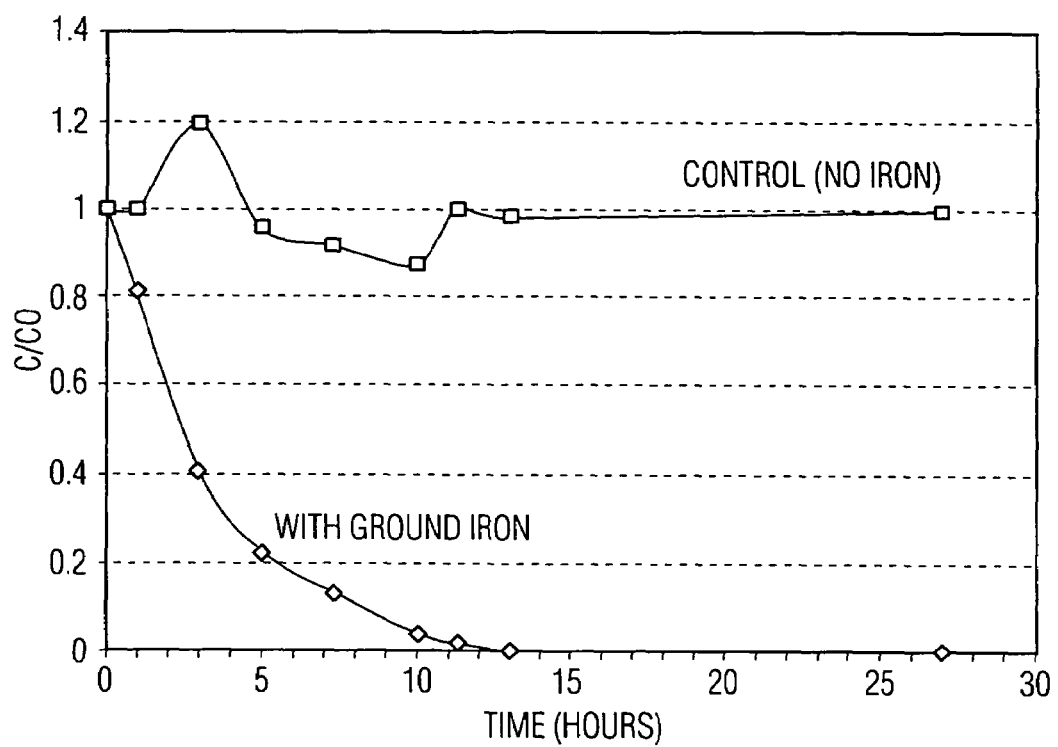
FIG. 12 is a plot of degradation of trichloroethene against time using compositions of the present invention compared to untreated water.

FIG. 12 is a plot of degradation (C/C$_0$) of trichloroethylene (TCE) against time with dispersed iron particles. The initial concentration of trichloroethylene was 10 mg/L. The batch reactor was charged with a 20 ml iron dispersion. FIG. 12 illustrates that dispersed iron particles prepared according to the invention remains effective for transformation of TCE, a common groundwater contaminant.

Figure 13:
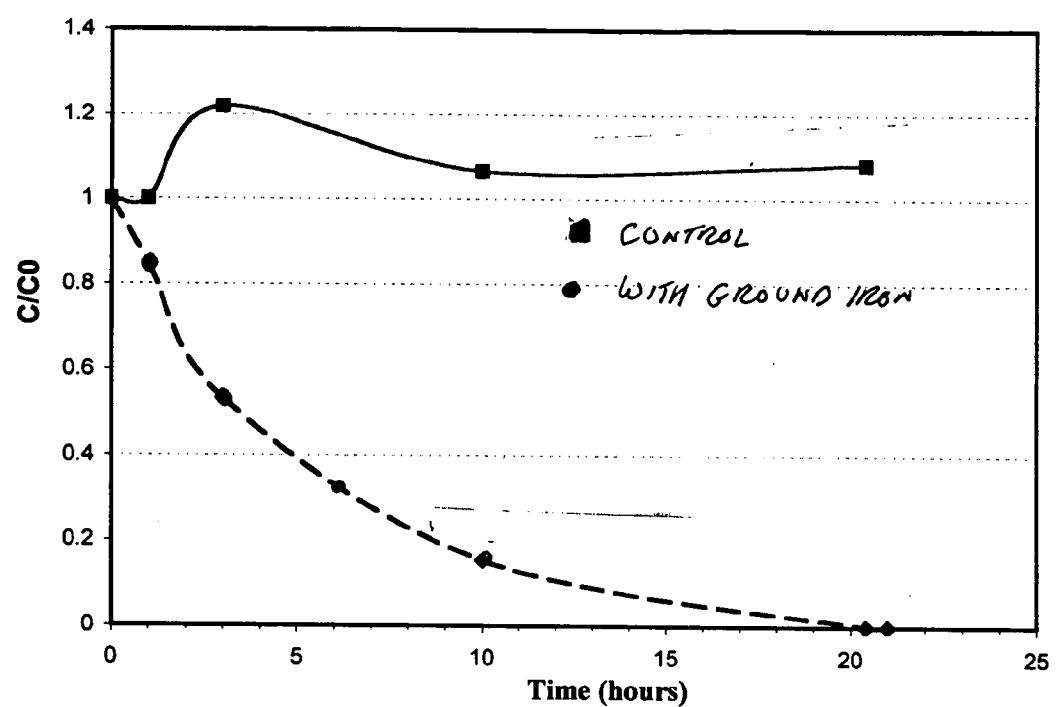
FIG. 13 is a plot of degradation of trichloroethene against time using a composition of the present invention compared to untreated water.

FIG. 13 is a plot of degradation of trichloroethene (TCE) against time in the presence of dispersed iron particles. The initial concentration of trichloroethene was 18 mg/l in a batch reactor containing 20 ml of dispersed iron. This plot shows that the dispersed iron particles remain effective for the transformation of the contaminant TCE.

The dispersions of the present invention can be used in various ways to treat contaminated soil and water. For example the iron dispersions can be directly injected into a body of water containing contaminants and with agitation the body of water will be remediated of the contaminants.

Dispersions according to the invention can be injected into deep aquifers through normal injection wells to treat the aquifer. Suitable monitoring wells will enable the user to control or time the injection of suspension. Large areas of contaminated water can be treated by spreading dispersions made according to a first aspect of the invention over the surface of the water.

Having thus described my invention what is desired to be secured by Letters Patent of the United States is set forth in the appended claims.

What is claimed is:

1. A method for treating contaminated soil and water comprising the steps of:
   a) preparing a stable dispersion of zero-valent iron particles having a maximum size of 10 μm in an aqueous solution containing a dispersant being one of block or graft copolymers containing both anchoring and stabilizing chains;
   b) subjecting said dispersion to one of a grinding or milling operation to produce a solution containing said zero-valent iron particles having an average size less than 100 nanometers; and
   c) applying said zero valent iron dispersion to said contaminated soil and water.

2. A method according to claim 1 including the step of using one of sodium polymethacrylate or ammonium polymethacrylate as a dispersant to stabilize said suspension containing zero valent iron particles.

3. A composition for treating contaminants in soil or water consisting of:
   a colloidal suspension of zero valent iron particles stabilized by one of a block or graft copolymer containing both anchoring and stabilizing chains wherein said zero valent iron particles have an average size less than 100 nanometers.

4. A composition according to claim 3 including less than 1 to 2% by weight of one of ammonium polymethacrylate and/or sodium polymethacrylate as a stabilizer for said suspension.

5. A composition according to claim 3 wherein said suspension includes up to 30% by wt iron particles.

6. A method for preparing a suspension of zero-valent iron particles comprising the steps of:
   preparing a stabilized dispersant of iron particles having a size no larger than 10 μm by introducing one of a block or graft copolymer containing both anchoring and stabilizing chains into said dispersant as a stabilizer; and
   grinding or milling said stabilized dispersant for a time sufficient to reduce the size of the zero valent iron particles to a maximum size of 100 nm.

7. A method according to claim 6 including the step of introducing one of sodium polymethacrylate or ammonium polymethacrylate into said dispersant as said stabilizer.

8. A method according to claim 7 including the step of using from 1 to 2% by weight of said ammonium polymethacrylate or said sodium polymethacrylate to produce said stabilized dispersant.

9. A method according to claim 7 including the step of using up to 30% by weight iron particles.

* * * * *